United States Patent Office 3,303,214
Patented Feb. 7, 1967

3,303,214
NITROSOSEMICARBAZIDES
Floyd E. Anderson, Boston, Mass., and Telfer L. Thomas, Pittsford, N.Y., assignors to Wallace & Tiernan Inc., Belleville, N.J., a corporation of Delaware
No Drawing. Filed May 13, 1964, Ser. No. 367,252
3 Claims. (Cl. 260—554)

The invention relates to nitrososemicarbazides.

An object of the invention is to provide a novel and reliable hypotensive agent.

We have found that the bornyl and fenchyl nitrososemicarbazides are effective hypotensive agents and are non-toxic in far above the therapeutically effective doses.

Suitable compounds include those represented by the following formula:

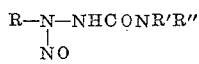

where R is a bornyl or fenchyl, and R' and R" are hydrogen, or a lower alkyl such as methyl or ethyl.

The bornyl nitrososemicarbazide was pharmaceutically tested on mice, rats, cats, dogs, and rabbits in large enough numbers to be statistically significant, and also was tested on one opossum. In all cases the compound was an effective hypotensive agent.

The fenchyl nitrososemicarbazide also was tested on mice, rats, cats and dogs, and was found to have substantially the same hypotensive action and low toxicity as the bornyl nitrososemicarbazide.

The following are examples of some tests made on the compounds of this invention:

ORAL ADMINISTRATION 10 mg. per kilogram of bornyl nitrososemicarbazide delivered intragastrically in an anesthetized dog produced a 32% decrease in mean blood pressure which reached maximum effect 1 hour after administration, and this effect persisted for at least 7 hours. At the end of 7 hours the mean blood pressure was still near the maximum effect, at which time the experiment was terminated.

INTRAVENOUS TESTS 1 mg. per kilogram of bornyl nitrososemicarbazide intravenously administered to a dog produced a 63% decrease in mean blood pressure which was maximum within 30 seconds after administration and persisted for a period of 70 minutes, gradually returning to the control level over a period of 70 minutes.

10 mg. per kilogram bornyl nitrososemicarbazide intravenously administered to a dog produced a 65% decrease in blood pressure practically immediately upon administration and gradually returned to the normal blood pressure level in 6 hours.

20 mg. per kilogram of bornyl nitrososemicarbazide intravenously administered to a dog produced an 80% decrease in blood pressure which gradually returned to the control level in 6½ hours.

ACUTE ORAL TOXICITY 500 mg. per kilogram of bornyl nitrososemicarbazide and also of fenchyl nitrososemicarbazide were separately orally administered to several mice. No deaths resulted. Also, 100 mg. per kilogram of bornyl nitrososemicarbazide and also fenchyl nitrososemicarbazide were likewise orally administered to an anesthetized dog. The blood pressure decreased approximately 50% for more than 6 hours. The dose was not fatal in any of the dogs.

The following Table gives the results of several blood pressure tests on animals made with bornyl nitrososemicarbazide. The letters "p.o." refer to oral administration and "iv." to intravenous administration. The percentage figures are the percent decrease in blood pressure from the normal or control level.

TABLE

| Animal | Amount | Time After Administration | Percent Decreased |
|---|---|---|---|
| Dog | 25 mg./kg. p.o. | ½ hr | 46 |
| Dog | 25 mg./kg. p.o. | 2½ hrs | 60 |
| Dog | 25 mg./kg. p.o. | 2 hrs | 30 |
| Dog | 5 mg./kg. iv. | 1 hr | 27 |
| Rat | 50 mg./kg. p.o. | | 46 |
| Opossum | 25 mg./kg. p.o. | 15 min | 24 |
| Do | 25 mg./kg. p.o. | 30 min | 33 |
| Do | 25 mg./flg. p.o. | 1 hr | 38 |
| Do | 25 mg./kg. p.o. | 2 hrs | 47 |
| Do | 25 mg./kg. p.o. | 3 hrs | 42 |
| Do | 25 mg./kg. p.o. | 4 hrs | 47 |
| Cat | 2.5 mg./kg. iv. | 1 hr | 36 |
| Cat | 5 mg./kg. iv. | 5 min | 60 |
| Cat | 5 mg./kg. iv. | 1 hr | 36 |
| Cat | 5 mg./kg. iv. | 3 hrs | 10 |
| Cat | 25 mg./kg. p.o. | 5 min | 60 |
| Cat | 25 mg./kg. p.o. | 30 min | 66 |
| Cat | 25 mg./kg. p.o. | 2 hrs | 66 |
| Cat | 25 mg./kg. p.o. | 3 hrs | 60 |
| Cat | 25 mg./kg. p.o. | 4 hrs | 55 |
| Cat | 25 mg./kg. p.o. | 5 hrs | 44 |
| Cat | 5 mg./kg. iv. | 5 min.-2¼ hrs | 45-14 |
| Cat | 5 mg./kg. iv. | 5 min.-3½ hrs | 70-16 |
| Cat | 25 mg./kg. p.o. | ½ hr.-3½ hrs | 16-36 |
| Cat | 25 mg./kg. p.o. | ¼ hr.-5 hrs | 45-31 |
| Rabbit | 25 mg./kg. p.o. | 15 min.-5 hrs | 35-15 |
| Do | 25 mg./kg. p.o. | 15 min.-5 hrs | 9-14 |
| Do | 25 mg./kg. p.o. | 15 min.-5 hrs | 8-50 |
| Rat | 5 mg./kg. iv. | | 47 |

Results similar to the above are obtained with fenchyl nitrososemicarbazide.

The following examples illustrate the preparation of the compounds of this invention:

*Example 1.—d,l-1-bornyl-1-nitrososemicarbazide* i. d,l-1-BORNYLSEMICARBAZONE

Camphor (158.4 gm., 1.0 mole) was dissolved in 365 ml. glacial acetic acid. To this was added a solution of 124 gm. (1.12 mole) semicarbazide hydrochloride and 104 gm. (1.26 mole) sodium acetate in 210 ml. water. The mixture was heated to 60° C. at which point only a little salt remained out of solution. The solution was allowed to crystallize over night. It was then filtered and washed twice with 300 ml. 65% acetic acid and four times with 300 ml. water. Dried in vacuo over phosphorus pentoxide, the yield was 218 gm. of product melting at 233° to 236° C.

ii. d,l-1-BORNYLSEMICARBAZIDE

The d,l-1-bornylsemicarbazone from I–i, was added to 400 ml. methanol and 40 ml. concentrated hydrochloric acid. Platinum oxide (3.0 gm.) was added to the slurry and the mixture was hydrogenated for about 60 hours at 60 p.s.i.g. hydrogen pressure in a Parr Hydrogenator. Hydrogen uptake was 67 p.s.i.g. All organic material was in solution. The catalyst was filtered off, and the solvent removed in vacuo. The residue was dissolved in 2500 ml. water and 200 ml. concentrated hydrochloric acid. A very small residue was filtered off. The filtrate was made alkaline, filtered and washed neutral with water. After drying in vacuo over phosphorus pentoxide, it weighed 140 gm., which was 67% of theoretical. The product melted at 200°–201° C.

iii. d,l-1-BORNYL-1-NITROSOSEMICARBAZIDE d,l-1-bornylsemicarbazide (30 gm., 0.142 mole) was dissolved in 500 ml. water and 70 ml. concentrated hydrochloric acid by warming. The almost-clear solution was treated with Celite, filtered, and cooled to ≦−5° C. The resulting thin slurry was nitrosated with 10 gm. sodium nitrite (0.145 mole) in 100 ml. water by dropwise addition over a period of about one hour.

The nitrite was added at such a rate as to have only a slight excess of nitrite present in the reaction mixture at any given time. The slurry was stirred with a slight excess of nitrous acid for half an hour at ≤−5° C., then filtered, and washed with water. The filter cake was reslurried with 750 ml. water, filtered, and washed neutral with water. Drying over phosphorus pentoxide in vacuo yielded 30.5 gm. (89%) of product melting at 126°–127° C. under nitrogen.

*Example 2.—d-1-fenchyl-1-nitrososemicarbazide* i. *d*-1-FENCHYLSEMICARBAZIDE

Fenchone (158 gm., 1.0 mole) was dissolved in 370 ml. glacial acetic acid. To this was added a solution of 124 gm. (1.12 mole) semicarbazide hydrochloride and 104 gm. (1.26 mole) sodium acetate in 210 ml. water. Heating to 90° C. did not cause solution. As nothing crystallized on standing over night, 300 ml. more acetic acid was added to cause solution. This solution was hydrogenated in the presence of 3.0 gm. platinum oxide at 60 p.s.i.g. hydrogen pressure on a Parr Hydrogenator for 24 hours. Hydrogen uptake was 24 p.s.i.g. The catalyst was filtered off and 1000 ml. 20% hydrochloric acid was added. The mixture was extracted twice with 600 ml. benzene and once with 600 ml. of chloroform, to remove acid-insoluble products. The aqueous layer was made alkaline, and the product filtered off and washed neutral with water. After drying over phosphorus pentoxide in vacuo, the product melted at 186°–189° C., and weighed 20.5 gm. (9.7% of theoretical).

ii. *d*-1-FENCHYL-1-NITROSOSEMICARBAZIDE

*d*-1-fenchylsemicarbazide (20 gm., 0.095 mole) was dissolved in 450 ml. water and 50 ml. concentrated hydrochloric acid by boiling. The almost-clear solution was treated with a little Celite, and filtered hot. It was cooled to ≤−3° C., and the resulting slurry was nitrosated with 6.7 gm. sodium nitrite in 50 ml. water by dropwise addition over a period of one and one-half hours. The slurry was stirred with a slight excess of nitrous acid at ≤−3° C. for half an hour, then filtered and washed with water. The filter cake was reslurried in 400 ml. water, filtered, and washed neutral with water. Drying in vacuo over phosphorus pentoxide yielded 17 gm. (75% of theoretical) product melting at 128°–129° C. under nitrogen, and having an $[\alpha]_D = +68.13$ in 95% ethanol.

In addition to the bornyl and fenchyl nitrososemicarbazides described above, other nitrososemicarbazides can be made in a similar manner as will be apparent to those skilled in the art by starting with the proper initial reactant, thus there may be made compounds having the general structure shown below:

R—N—NHCONR′R″
 |
 NO

Where R, R′, and R″=H, alkyl, substituted alkyl, alicyclic, substituted alicyclic (especially terpenoid residues), aralkyl, substituted aralkyl, heterocyclic and substituted heterocyclic.

Compounds of the above formula are all useful in studying hypotensive action whether or not they are themselves therapeutically valuable hypotensive agents. Studies are continuing on these types of compounds, but in general R is controlling for hypotensive action and, so far we have not found any compounds which are remarkable hypotensive agents where R is other than a bornyl or fenchyl. R and R′ apparently can be varied widely without destroying hypotensive effect and specifically may be hydrogen or lower alkyl such as methyl and ethyl, although the other members, as indicated above, are not precluded.

The following are several nitrososemicarbazide compounds which also have been made and studied:

1-(3,3-dimethylbutyl)-1-nitrososemicarbazide, M.P. 106.5° to 107° C.;

1-(p-methylbenzyl)-1-nitrososemicarbazide, M.P. 131° to 131.5° C.;

1-phenethyl-1-nitrososemicarbazide, M.P. 101° to 102° C.;

1-(α-methylphenylethyl)-1-nitrososemicarbazide, M.P. 122° to 123° C.;

*l*-1-bornyl-1-nitrososemicarbazide, M.P. 126.5° to 127.5° C.; $[\alpha]_D = 55.52$ in 95% ethanol.

All of the above described compounds and those of the above general formula are useful as intermediates in making the corresponding pseudo oxatriazoles. Such pseudo oxatriazoles like those shown in the Kier Keating application, Serial No. 274,906 filed April 23, 1963, have high physiological absorption characteristics and are useful in studies on hypertension and in research on comparative physiological effect of pseudo oxatriazoles and the corresponding semicarbazide.

We claim:
1. A compound having the formula

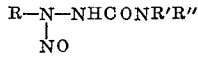

where R is a member of the group consisting of bornyl and fenchyl, and R′ and R″ are members of the group consisting of hydrogen and lower alkyl.

2. 1-bornyl-1-nitrososemicarbazide.
3. 1-fenchyl-1-nitrososemicarbazide.

No references cited.

ALEX MAZEL, *Primary Examiner.*

HENRY R. JILES, *Examiner.*